United States Patent
Gowda et al.

(10) Patent No.: US 11,507,157 B2
(45) Date of Patent: Nov. 22, 2022

(54) HOT-INSERTED DEVICES

(71) Applicant: Dell Products L.P., Round Rock, TX (US)

(72) Inventors: Srinivas Giri Raju Gowda, Santa Clara, CA (US); Syama Sundar Poluri, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 173 days.

(21) Appl. No.: 16/863,599

(22) Filed: Apr. 30, 2020

(65) Prior Publication Data

US 2021/0341980 A1 Nov. 4, 2021

(51) Int. Cl.
*G06F 1/26* (2006.01)

(52) U.S. Cl.
CPC ..................... *G06F 1/26* (2013.01)

(58) Field of Classification Search
CPC ........................................................ G06F 1/26
USPC ......................................................... 713/300
See application file for complete search history.

(56) References Cited

U.S. PATENT DOCUMENTS

| | | | | |
|---|---|---|---|---|
| 6,286,066 B1* | 9/2001 | Hayes | .................. | G06F 13/4081 235/492 |
| 6,529,987 B1* | 3/2003 | Reid | ................... | G06F 13/4081 710/302 |
| 2006/0161712 A1* | 7/2006 | Arramreddy | ....... | G06F 13/4031 710/302 |
| 2008/0005439 A1* | 1/2008 | Matsukuma | ........ | G06F 13/4081 710/302 |
| 2009/0024779 A1* | 1/2009 | Chan | ....................... | G06F 1/187 710/304 |
| 2010/0289949 A1* | 11/2010 | Kobayashi | ....... | H04N 21/43632 348/469 |
| 2013/0151569 A1* | 6/2013 | Therien | ..................... | G06F 9/44 707/803 |
| 2014/0289444 A1* | 9/2014 | Kuramoto | ........... | G06F 13/4022 710/316 |
| 2017/0286349 A1* | 10/2017 | Edirisooriya | ....... | G06F 13/4081 |
| 2019/0042506 A1* | 2/2019 | Devey | ................. | H04L 41/0816 |

* cited by examiner

*Primary Examiner* — Vincent H Tran

(74) *Attorney, Agent, or Firm* — Jackson Walker L.L.P.

(57) ABSTRACT

An information handling system may include a processor, an interface configured for hot-insertion of information handling resources, and a management controller configured to provide out-of-band management of the information handling system. The management controller may be configured to: receive a first notification that an information handling resource has been hot-removed from the interface; and in response to the first notification, disable power to the interface to prevent initialization of an information handling resource that is hot-inserted at the interface.

20 Claims, 2 Drawing Sheets

HOT-INSERTED DEVICES

TECHNICAL FIELD

The present disclosure relates in general to information handling systems, and more particularly to handling of hot-inserted information handling resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Various problems are known in the field of hot-inserting information handling resources into an information handling system, also referred to as hot-plugging. Generally speaking, these terms refer to the attachment of an information handling resource after the system is already turned on (e.g., after an operating system (OS) has been booted). This disclosure has particular applications in the context of hot-insertion of PCIe/NVMe devices such as physical storage resources. That context will be discussed in detail herein for the sake of concreteness, but it should be understood that aspects of this disclosure may also be applied to other types of information handling resources.

There are many mechanisms available ensure that there are no catastrophic failures when a physical storage resource is hot-removed (e.g., by physically removing it from an interface such as a slot). However, once such a resource is removed, there is no reliable mechanism for determining when it is safe to hot-insert a resource (e.g., the same resource that was removed, or a different resource) into the slot again.

For example, an OS or storage application may still have active I/O or device references when a storage resource is hot-removed. The OS and/or software-defined storage (SDS) management software may need additional time to clean up its I/O and management stack before it can recover and/or reinitialize and/or accommodate a new storage resource on the same slot.

The lack of any mechanism in existing systems to reliably determine readiness at the level of an OS or SDS management application before hot-inserting a new device can result in catastrophic scenarios, should a new device be inserted before the system is ready.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with handling of hot-inserted information handling resources may be reduced or eliminated.

In accordance with embodiments of the present disclosure, an information handling system may include a processor, an interface configured for hot-insertion of information handling resources, and a management controller configured to provide out-of-band management of the information handling system. The management controller may be configured to: receive a first notification that an information handling resource has been hot-removed from the interface; and in response to the first notification, disable power to the interface to prevent initialization of an information handling resource that is hot-inserted at the interface.

In accordance with these and other embodiments of the present disclosure, a method may include, in an information handling system that includes an interface configured for hot-insertion of information handling resources and further includes a management controller configured to provide out-of-band management of the information handling system: the management controller receiving a first notification that an information handling resource has been hot-removed from the interface; and in response to the first notification, the management controller disabling power to the interface to prevent initialization of an information handling resource that is hot-inserted at the interface.

In accordance with these and other embodiments of the present disclosure, an article of manufacture may include a non-transitory, computer-readable medium having computer-executable code thereon that is executable by a processor of a management controller of an information handling system for receiving a first notification that an information handling resource has been hot-removed from an interface of the information handling system; and in response to the first notification, disabling power to the interface to prevent initialization of an information handling resource that is hot-inserted at the interface.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
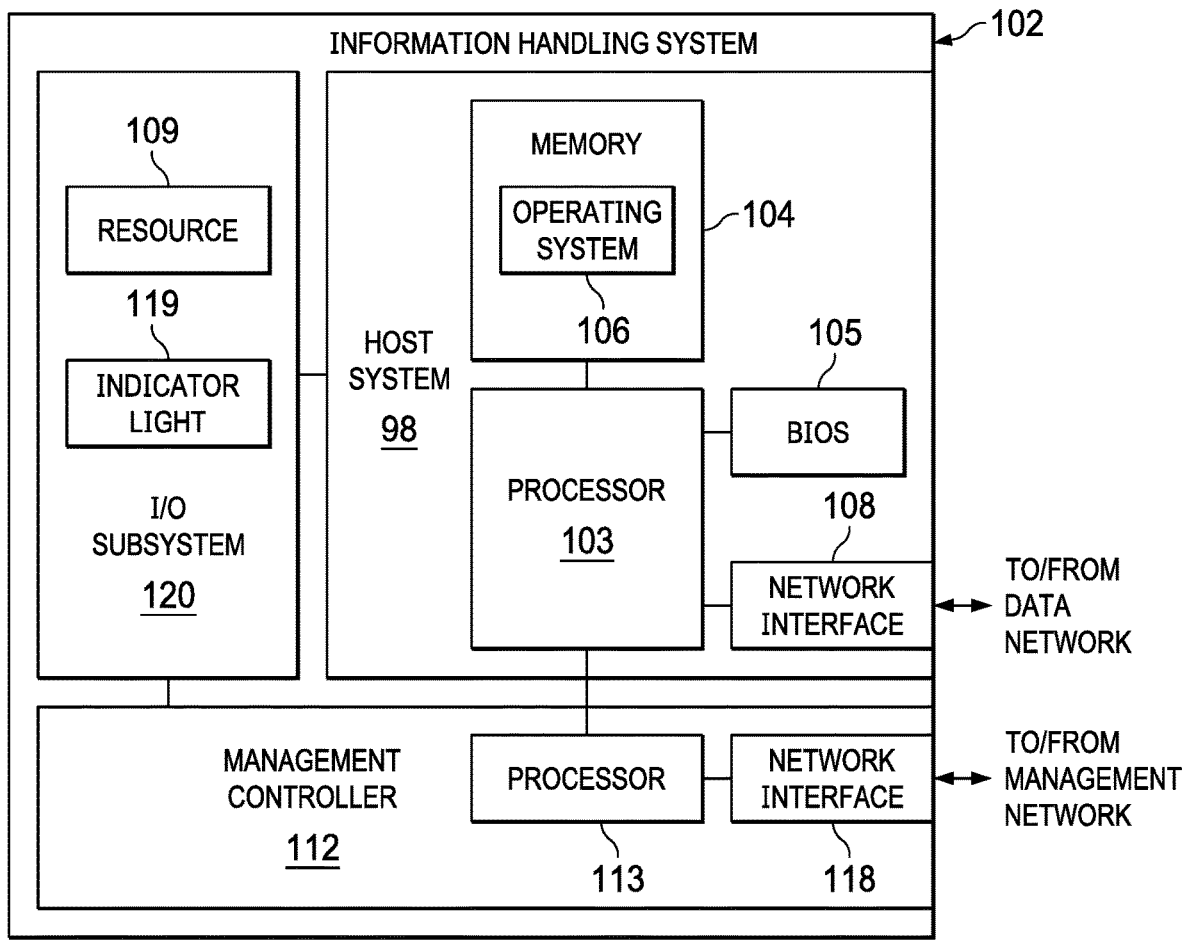
FIG. 1 illustrates a block diagram of an example information handling system, in accordance with embodiments of the present disclosure.
Figure 2:
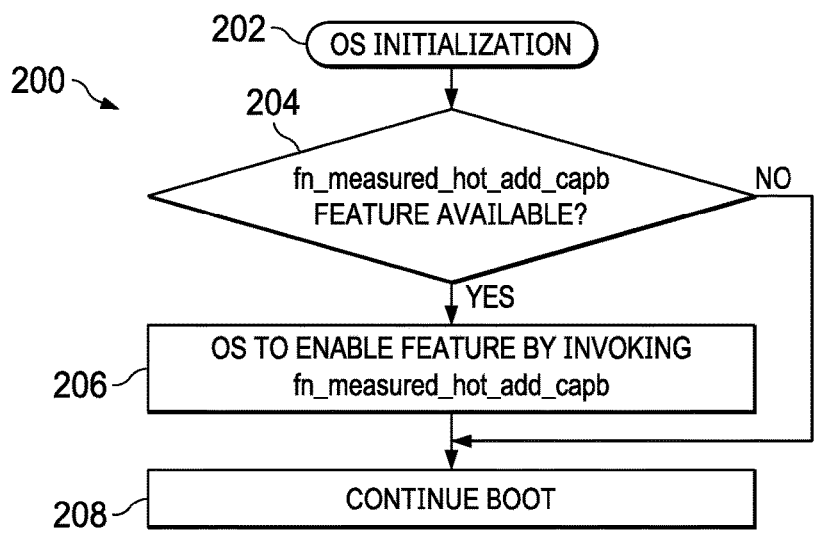
FIG. 2 illustrates an example flow diagram of a method in accordance with embodiments of the present disclosure.
Figure 3:
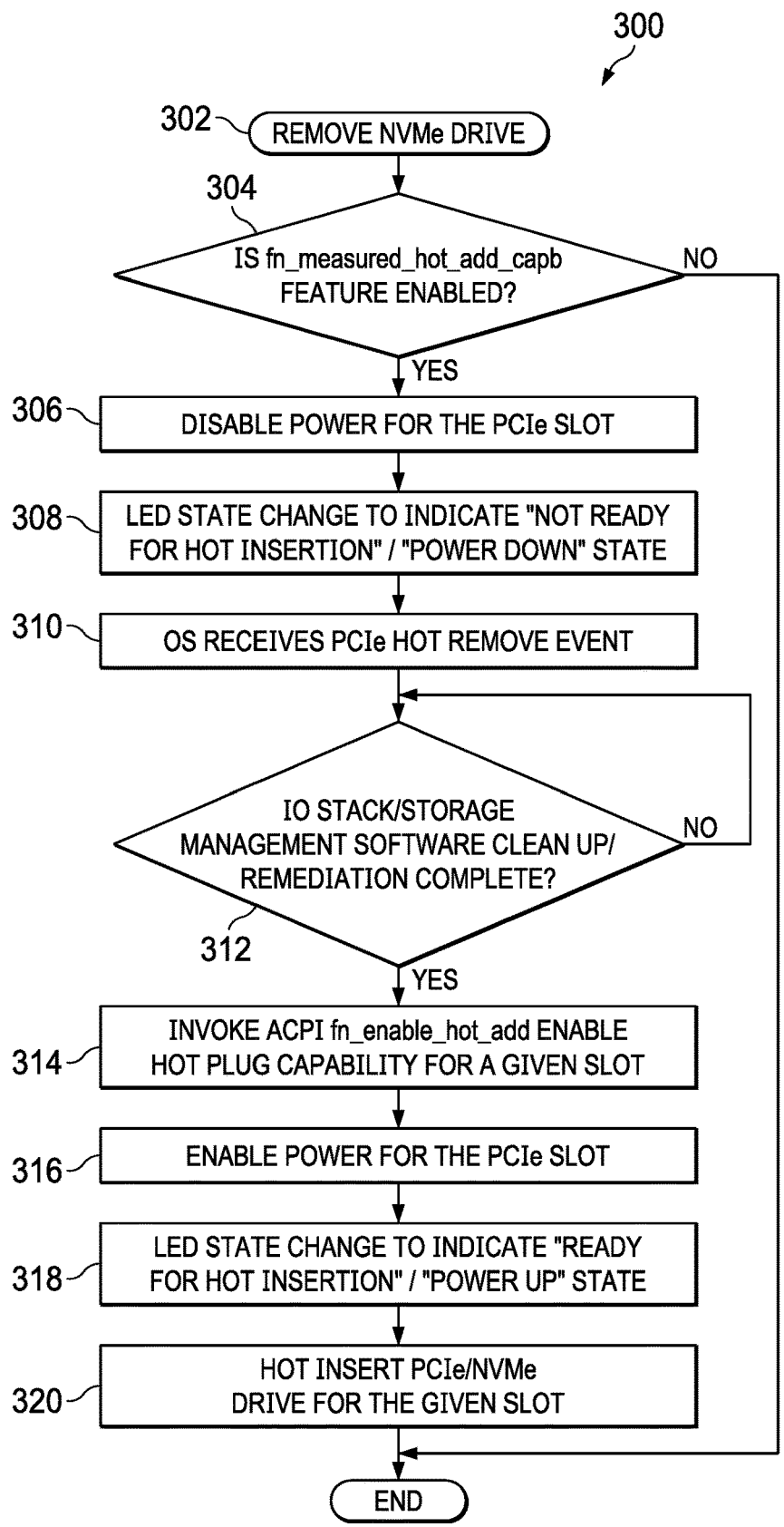
FIG. 3 illustrates an example flow diagram of a method in accordance with embodiments of the present disclosure.

Preferred embodiments and their advantages are best understood by reference to FIGS. 1 through 3, wherein like numbers are used to indicate like and corresponding parts. For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

Information handling system 102 may also include an I/O subsystem 120 (e.g., a backplane with one or more drive slots). I/O subsystem 120 may be communicatively coupled to host system 98 and management controller 112 via any desired communications bus.

I/O subsystem 120 may include one or more information handling resources 109. Information handling resources 109 may be coupled to processor 103 (e.g., via a PCI interface, a PCIe interface, a USB interface, or any other suitable communications interface). For example, an information handling resource 109 may be a PCIe storage device such as an NVMe drive. In particular, an information handling resource 109 may be a hot-insertable resource. As discussed in more detail below, various embodiments of this disclosure provide ways of ensuring that information handling system 102 is ready to accept a new information handling resource 109 before it is powered on and/or initialized.

I/O subsystem 120 may also include indicator light 119 or any other mechanism for indicating the readiness and/or non-readiness to accept a hot-inserted information handling resource 109. For example, indicator light 119 may include a light-emitting diode (LED). The readiness status may be shown by turning on, turning off, blinking, changing a blink rate, changing color, etc. In some embodiments, I/O subsystem 120 may include several indicator lights 119, such that each drive slot that can accept an information handling resource 109 may have its own indicator light 119. In other embodiments, in addition to or instead of indicator light(s) 119, information handling system 102 may include other types of indication. For example, the functionality of indicator light 119 may be provided by a software management console to indicate to a user whether or not the system is ready to receive a new information handling resource 109.

Turning now to FIG. 2, a flow chart is shown of an example method 200, in accordance with embodiments of this disclosure. Some embodiments of method 200 (as well as method 300 discussed below) may make use of Advanced Configuration and Power Interface (ACPI) functionality. FIG. 2 provides one example for a system to determine whether or not functionality in accordance with this disclosure is available.

At step 202, an OS may be initialized. At step 204, a determination is made as to whether or not an ACPI function referred to herein as fn_measured_hot_add_capb is implemented. This function may provide a mechanism for system software to register and/or enable and/or disable platform features in accordance with this disclosure. Although this disclosure discusses implementing various features via ACPI, it should be noted that in other embodiments, mechanisms other than ACPI may be used. For example, any of various types of OS or platform management communications mechanisms may be used to implement one or more portions of the present disclosure.

If fn_measured_hot_add_capb is not available, the system may proceed to a normal boot at step 208. If fn_measured_hot_add_capb is available, the OS may enable features in accordance with this disclosure by invoking fn_measured_hot_add_capb at step 206. The system may then continue booting at step 208. After step 208, method 200 may end.

Turning now to FIG. 3, a flow chart is shown of an example method 300, in accordance with embodiments of this disclosure.

FIG. 3 refers to another ACPI function referred to as fn_enable_hot_add. This function may provide a mechanism for an OS or storage management software to communicate to the platform its readiness to accommodate the hot-insertion of a device at a given slot. In some embodiments, the fn_measured_hot_add_capb function referred to in FIG. 2 may provide information about whether or not fn_enable_hot_add is implemented in a given system.

Method 300 begins at step 302, when an information handling resource (in this example, an NVMe drive) is removed from an interface (in this example, a slot such as a PCIe slot). In other embodiments, no such removal is necessary. For example, the system may use embodiments of this disclosure to indicate whether or not it is ready to accept a hot-inserted information handling resource, even if no hot-removal has taken place.

At step 304, a determination is made as to whether the fn_measured_hot_add_capb function is enabled. If not, the method may end at step 322.

If fn_measured_hot_add_capb is enabled, however, then at step 306, a management controller may disable power for the PCIe slot from which the NVMe drive has been hot-removed.

At step 308, the management controller may also cause an indicator light such as an LED to indicate that the slot is powered down and/or not ready for hot-insertion. Various types of indicator light behavior are possible, with some examples as described above.

At step 310, an OS of the information handling system may receive a notification of the PCIe hot-removal event. The OS may perform various remediation actions to clean up and/or recover from the hot-removal, as it prepares its I/O system and/or storage management software stack to receive a new drive.

The method may loop at step 312 until this process is complete. Any attempt to hot-insert a new drive into the slot in question during this state may fail, because the power to the slot has been disabled. Further, the indicator light actions mentioned above may discourage users from attempting to perform such a hot-insertion.

Once the clean-up procedure is finished, the OS and/or storage management software is ready to accommodate a hot-add event for a given slot. The OS and/or storage management software may then at step 314 invoke the fn_enable_hot_add ACPI function to indicate its readiness.

At step 316, the management controller may then enable power to the PCIe slot. At step 318, the management controller may also change the LED state to indicate that the system is powered-up and/or ready for hot-insertion. Various types of indicator light behavior are possible, with some examples as described above.

After step 318, any attempt to hot-add a drive will result in a successful procedure in which the OS and/or storage management software gracefully handles the hot-insertion of a drive from a systems software layer (e.g., not just from the layer of the platform/firmware). At step 320, a drive is successfully hot-inserted, and the method ends at step 322.

Accordingly, embodiments of this disclosure may address an industry-wide issue of not having a deterministic and repeatable mechanism for platform and systems software to reliably handle hot-add events. Embodiments may provide a mechanism for high-level system software to regulate the hot-insertion workflow, enabling storage applications to gracefully manage the procedure, preventing potentially catastrophic scenarios.

Further, this disclosure may also provide benefits in the situation where a user erroneously hot-inserts a drive prior to the system being ready. If power to the slot is disabled when the drive is erroneously inserted, then nothing may happen at that time. When the system is ready, power may be re-enabled, and the drive may be initialized at that time.

One of ordinary skill in the art with the benefit of this disclosure will understand that the preferred initialization point for the methods depicted in FIGS. 2-3 and the order of the steps comprising those methods may depend on the implementation chosen. In these and other embodiments, this method may be implemented as hardware, firmware, software, applications, functions, libraries, or other instructions. Further, although FIGS. 2-3 disclose a particular number of steps to be taken with respect to the disclosed methods, the methods may be executed with greater or fewer steps than those depicted. The methods may be implemented using any of the various components disclosed herein (such as the components of FIG. 1), and/or any other system operable to implement the method.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
a processor;
an interface configured for hot-insertion of information handling resources; and
a management controller configured to provide out-of-band management of the information handling system; wherein the management controller is configured to:
receive a first notification that an information handling resource has been hot-removed from the interface;
in response to the first notification, disable power to the interface to prevent initialization of an information handling resource that is hot-inserted at the interface;
subsequently determine that a clean-up procedure related to the interface has been completed and that the interface is ready to receive a second information handling resource; and
in response to determining that the interface is ready to receive the second information handling resource, re-enable power to the interface prior to the second information handling resource being received by the interface.

2. The information handling system of claim 1, wherein the information handling resource is the second information handling resource.

3. The information handling system of claim 1, wherein the determination that the interface is ready to receive the second information handling resource is based on a second notification received from an operating system executing on the information handling system.

4. The information handling system of claim 1, wherein the information handling resource is a Peripheral Component Interconnect Express (PCIe) resource.

5. The information handling system of claim 1, wherein the information handling resource is a storage resource.

6. The information handling system of claim 1, wherein the information handling system is further configured to:
   execute an Advanced Configuration and Power Interface (ACPI) function to determine availability of a feature relating to disabling power to the interface.

7. The information handling system of claim 1, wherein the information handling system is further configured to change a state of an indicator light in response to the first notification.

8. A method comprising, in an information handling system that includes an interface configured for hot-insertion of information handling resources and further includes a management controller configured to provide out-of-band management of the information handling system:
   the management controller receiving a first notification that an information handling resource has been hot-removed from the interface;
   in response to the first notification, the management controller disabling power to the interface to prevent initialization of an information handling resource that is hot-inserted at the interface;
   the management controller subsequently determining that a clean-up procedure related to the interface has been completed and that the interface is ready to receive a second information handling resource; and
   in response to determining that the interface is ready to receive the second information handling resource, the management controller re-enabling power to the interface prior to the second information handling resource being received by the interface.

9. The method of claim 8, wherein the management controller is configured to disable power to the interface by executing an Advanced Configuration and Power Interface (ACPI) function.

10. The method of claim 8, wherein the information handling resource is the second information handling resource.

11. The method of claim 8, further comprising the management controller changing a state of an indicator light a first time in response to the first notification.

12. The method of claim 11, further comprising the management controller changing the state of the indicator light a second time in response to the determination that the interface is ready to receive the second information handling resource.

13. The method of claim 11, wherein changing the state of the indicator light the first time includes a state change selected from the group consisting of:
   enabling the indicator light;
   disabling the indicator light;
   blinking the indicator light;
   changing a blink rate of the indicator light; and
   changing a color of the indicator light.

14. An article of manufacture comprising a non-transitory, computer-readable medium having computer-executable code thereon that is executable by a processor of a management controller of an information handling system for:
   receiving a first notification that an information handling resource has been hot-removed from an interface of the information handling system;
   in response to the first notification, disabling power to the interface to prevent initialization of an information handling resource that is hot-inserted at the interface;
   subsequently determining that a clean-up procedure related to the interface has been completed and that the interface is ready to receive a second information handling resource; and
   in response to determining that the interface is ready to receive the second information handling resource, re-enabling power to the interface prior to the second information handling resource being received by the interface.

15. The article of claim 14, wherein the information handling resource is the second information handling resource.

16. The article of claim 14, wherein the determination that the interface is ready to receive the second information handling resource is based on a second notification received from an operating system executing on the information handling system.

17. The article of claim 14, wherein the information handling resource is a Peripheral Component Interconnect Express (PCIe) resource.

18. The article of claim 14, wherein the information handling resource is a storage resource.

19. The article of claim 14, wherein the code is further executable for changing a state of an indicator light in response to the first notification.

20. The article of claim 14, wherein the code is further executable for executing an Advanced Configuration and Power Interface (ACPI) function to determine availability of a feature relating to disabling power to the interface.

* * * * *